United States Patent
Bruno et al.

(10) Patent No.: US 11,784,740 B2
(45) Date of Patent: Oct. 10, 2023

(54) PHYSICAL PATH CONTROL IN HIERARCHICAL NETWORKS

(71) Applicant: Telefonaktiebolaget LM Ericsson (publ), Stockholm (SE)

(72) Inventors: Gianmarco Bruno, Genoa (IT); Daniele Ceccarelli, Stockholm (SE); Francesco Fondelli, Genoa (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 252 days.

(21) Appl. No.: 16/334,222

(22) PCT Filed: Oct. 4, 2016

(86) PCT No.: PCT/EP2016/073701
§ 371 (c)(1),
(2) Date: Mar. 18, 2019

(87) PCT Pub. No.: WO2018/065038
PCT Pub. Date: Apr. 12, 2018

(65) Prior Publication Data
US 2019/0229830 A1  Jul. 25, 2019

(51) Int. Cl.
*H04J 14/02* (2006.01)
*H04L 41/0806* (2022.01)
(Continued)

(52) U.S. Cl.
CPC ...... *H04J 14/0227* (2013.01); *H04J 14/0289* (2013.01); *H04L 41/044* (2013.01);
(Continued)

(58) Field of Classification Search
CPC combination set(s) only.
See application file for complete search history.

(56) References Cited

U.S. PATENT DOCUMENTS 7,415,003 B1   8/2008  Ogura et al.
8,027,354 B1   9/2011  Portolani et al.
(Continued)

FOREIGN PATENT DOCUMENTS

CN   102904837 A   1/2013
CN   104202264 A   12/2014
(Continued)

OTHER PUBLICATIONS

Gerstel, O, et al., "Elastic Optical Networking: A New Dawn for the Optical Layer?", IEEE Communications Magazine, vol. 50, No. 2, IEEE Communications Society, Feb. 2012, pp. s12-s20.
(Continued)

*Primary Examiner* — Faruk Hamza
*Assistant Examiner* — Alan L Lindenbaum
(74) *Attorney, Agent, or Firm* — Murphy, Bilak & Homiller, PLLC

(57) ABSTRACT

A method in a physical network controller (130) for configuring physical resources to provide a physical layer connection in a communications network (100). The physical layer connection provides physical connectivity for a higher layer network connection controlled by a higher layer network controller (120) in a hierarchical arrangement with the physical network controller (130). The method comprising the physical network controller (130) receiving (210) an indication for a minimum traffic capacity for the physical layer connection. The physical network controller configuring (220) physical resources according to the received indication.

12 Claims, 12 Drawing Sheets

(51) Int. Cl.
  *H04L 41/044* (2022.01)
  *H04L 41/0896* (2022.01)
  *H04Q 11/00* (2006.01)
  *H04L 41/5003* (2022.01)

(52) U.S. Cl.
  CPC ...... *H04L 41/0806* (2013.01); *H04L 41/0896* (2013.01); *H04Q 11/0066* (2013.01); *H04L 41/5003* (2013.01); *H04Q 2011/0081* (2013.01); *H04Q 2011/0086* (2013.01)

(56) References Cited

U.S. PATENT DOCUMENTS

| | | | |
|---|---|---|---|
| 2009/0059812 A1* | 3/2009 | Chinnaswamy | H04L 41/5061 370/253 |
| 2014/0269547 A1 | 9/2014 | Valliappan et al. | |
| 2014/0307556 A1 | 10/2014 | Zhang | |
| 2015/0043570 A1* | 2/2015 | Filsfils | H04L 41/0813 370/351 |
| 2015/0063802 A1 | 3/2015 | Bahadur et al. | |
| 2015/0131997 A1* | 5/2015 | Syed | H04Q 11/0066 398/69 |
| 2015/0188837 A1 | 7/2015 | Djukic et al. | |
| 2015/0256407 A1 | 9/2015 | Iizawa et al. | |
| 2016/0203022 A1 | 7/2016 | Challa et al. | |
| 2016/0344652 A1* | 11/2016 | Ashwood-Smith | H04L 45/245 |

FOREIGN PATENT DOCUMENTS

| | | |
|---|---|---|
| CN | 104426766 A | 3/2015 |
| CN | 105960783 A | 9/2016 |
| JP | 2001144759 A | 5/2001 |
| JP | 2003249955 A | 9/2003 |
| JP | 2006074452 A | 3/2006 |
| JP | 2011135422 A | 7/2011 |
| JP | 2012257146 A | 12/2012 |
| JP | 2015530768 A | 10/2015 |
| JP | 2016134664 A | 7/2016 |
| WO | 2013169158 A1 | 11/2013 |

OTHER PUBLICATIONS

Juno, Masahiko, et al., "Spectrum-Efficientand Scalable Elastic Optical Path Network: Architecture, Benefits, and Enabling Technologies", Topics in Optical Communications; IEEE Communication Magazine, Nov. 2009, pp. 66-73.

Khalid, A., et al., "1-GB/s Transmission Over a Phosphorescent White LED by Using Rate-Adaptive Discrete Multitone Modulation", IEEE Photonics Journal; an IEEE Photonics Society Publication; vol. 4, No. 5, Oct. 2012, pp. 1465-1473.

Morea, Annalisa, et al., "Datarate Adaptation for Night-Time Energy Savings in Core Networks", Journal of Lightwave Technology, vol. 31, No. 5, Mar. 1, 2013, pp. 779-785.

Morea, Annalisa, et al., "Efficiency gain from elastic optical networks", Optical Transmission Systems, Subsystems, and Technologies IX; Proc. of SPIE-OSA-IEEE Asia Communications and Photonics, vol. 8309, 2011, pp. 1-7.

Ceccarelli, Daniele, et al., "Framework for Abstraction and Control of Traffic Engineered Networks", draft-ietf-teas-actn-framework-00; IETF Trust, Jul. 6, 2016, pp. 1-28.

* cited by examiner

PHYSICAL PATH CONTROL IN HIERARCHICAL NETWORKS

TECHNICAL FIELD

The disclosure relates to a method of controlling a physical path in a hierarchical network, and a network control entity configured to control a physical path in a hierarchical network.

BACKGROUND

Future mobile networks will need to satisfy a wide range of challenging requirements such as very high bandwidth, cheap and wide coverage, low delays etc.) One homogeneous network will not be able to satisfy these requirements.

Software Defined Networking (SDN) is a networking paradigm that decouples control software from specialized forwarding hardware by virtualizing underlying physical resources via (as much as possible) standardized southbound interfaces to the network elements and providing a programmatic north-bound interface, allowing for increased service deployment agility.

The IETF defines a framework standardizing an interface between SDN controllers and the physical communications network entities; this is called the Abstraction and Control of Traffic Engineered Networks, ACTN, framework, for example as described in IETF Internet Draft "Framework for Abstraction and Control of Traffic Engineered Networks", draft-ietf-teas-actn-framework-00, Jul. 6, 2016. The ACTN framework defines a hierarchical architecture for communications networks.

ACTN may provide one or more of the following benefits:
a) abstraction of the underlying network resources to higher-layer applications and customers;
b) virtualization of particular underlying resources, whose selection criterion is the allocation of those resources to a particular customer, application or service;
c) slicing infrastructure to connect multiple customers to meet specific customer's service requirements;
d) creation of a virtualized environment allowing operators to view and control multi-domain networks into a single virtualized network and the possibility of providing a customer with virtualized network or services (totally hiding the network);
e) a virtualization/mapping network function that adapts customer requests to the virtual resources (allocated to them) to the supporting physical network control and performs the necessary mapping, translation, isolation and security/policy enforcement. This function is often referred to as orchestration; and,
f) the presentation of the networks as a virtualized topology to the customers via open and programmable interfaces, this allows for the recursion of controllers in a customer-provider relationship.

ACTN may support any traffic-engineered connection-oriented technology, including but not limited to: optical networks, MPLS Transport Profile (MPLS-TP), MPLS Traffic Engineering (MPLS-TE).

A Physical Network Controller (PNC) domain of an ACTN is defined as including all the resources under the control of a single PNC. It can be composed by different routing domains, administrative domains and different layers. The physical resources of a domain include providing a physical layer connection, this may be described as a physical network path or tunnel through which customer service traffic is routed. A physical resource involves specific physical transmission media such as an optical transport network involving wavelength division multiplexing or microwave links or radio links such as WCDMA or LTE. The configuration of such resources may be, for example, as a label-switched path.

In accordance with ACTN a physical network path is established through a number of logical steps and signalling procedures from higher network layers, each layer may involve differing levels if abstraction or virtualization. At the Customer Network Control (CNC) layer a network path may be a virtual path through a virtual network or network slice which meets the required customer service.

In an example ACTN based network, as depicted in FIG. 1, a communications network 10, comprises one or more network controllers 40 and one or more physical network controllers 30. The physical resources controlled by each physical network controller are grouped into domains 20. In some examples, the network controller is a Multi Domain Service Controller (MDSC). In some examples, the physical network controller is a Physical Network Controller (PNC). The PNC 30 and MDSC 40 may be considered as Software Defined Networking (SDN) controllers. Examples of physical resources controlled by a domain can include packet switched transport, optical transport and radio access. Such domains may be entirely homogeneous with regards to the technology involved, for example they may employ only IEEE 802.11 (Wi-Fi) radio accesses or Wavelength Division Multiplexing. In other embodiments domains may involve multiple technologies such as a 3GPP multi-Radio Access Type (RAT) radio access network employing Long Term Evolution (LTE) and Universal Mobile Telecommunications System (UMTS) radio base stations.

FIG. 1 shows how the MDSC exposes a single-network, virtualized view called VN (Virtualized Network) of a multi-domain, multi-technology network. Finally, PNCs are in charge of actual VN rendering via south-bound interfaces.

The VN is defined in terms of business requirements, e.g. SLA (Service Level Agreement) which are mapped towards the PNCs and finally towards the network elements. Communications between PNCs typically does not occur because they are in principle owned by possible competing organizations with all related aspects of security, privacy, etc. The MDSC 40 may request a packet Label-Switched Path (LSP) of bandwidth W, via a MDSC-PNC interface (MPI) 50 to the PNCs A and C according to the given constraints and calculates the entry points to the domain B.

The MDSC sends a request to the PNC domain B to provide the connection 60 of bandwidth W between the said entry points 80 allowing tolerance to a fault, e.g. a WDM link cut. The protection or redundancy tunnel 70 may be much longer than the working one due to its topology or just wavelength availability. In some cases, expensive regenerations may be required.

In the event of a fault, the WDM layer provides a new LSP 70 of bandwidth W between its endpoints and the other domains benefit from its restoration capability. In such a scenario the physical domain is self-managing and the other domains do not need to take any action.

It is highly desirable to be able to manage the physical resources such as those under the control of a PNC in the ACTN framework in an efficient manner, in particular with respect to recovery and redundancy.

SUMMARY

A first aspect of the disclosure provides a method in a physical network controller (130) for configuring physical resources to provide a physical layer connection in a communications network (100), wherein the physical layer connection provides physical connectivity for a higher layer network connection controlled by a higher layer network controller (120) in a hierarchical arrangement with the physical network controller (130). The method comprises the physical network controller (130) receiving (210) an indication for a minimum traffic capacity for the physical layer connection and the physical network controller configuring (220) physical resources according to the received indication. This provides the advantage that the physical network controller knows the minimum traffic capacity used by the higher network layer and can therefore provide a physical layer connection which can support additional traffic capacity but the physical network controller guarantees to provide the minimum traffic capacity.

In a further embodiment of the first aspect the configured physical resources provide a variable traffic capacity physical layer connection to provide at least the indicated minimum traffic capacity. This provides the advantage that the extra capacity beyond the minimum traffic capacity is increased or decreased for example due to a failure, a degradation, a recovery and/or an enhancement.

In a further embodiment of the first aspect the variable traffic capacity is provided by an elastic physical network, and optionally. The elastic physical network involves one or more of: fractional bandwidth techniques; adaptive modulation and coding schemes; Elastic Optical Network, elastic reconfigurable optical add-drop multiplexing; bandwidth variable transceivers.

In a further embodiment of the first aspect the physical network controller reports (230) to the higher layer network controller (120) an indication of an available traffic capacity for the physical layer connection.

In a further embodiment of the first aspect the reported traffic capacity is one or more of: a minimum traffic capacity, a best effort traffic capacity, and a maximum available traffic capacity.

In a further embodiment of the first aspect the configured resources are a first set of resources, the method further comprising the physical network controller configuring (310) a second set of physical resources according to the indicated minimum traffic capacity and using (330) the second set of physical resources for the physical layer connection when at least a part of the first set of physical resources is unavailable.

In a further embodiment of the first aspect the second set of physical resources provides less capacity than the first set of physical resources.

A second aspect of the disclosure provides a physical network controller (130) for configuring physical resources to provide a physical layer connection in a communications network (100). The physical layer connection provides physical connectivity for a higher layer network connection controlled by a higher layer network controller in a hierarchical arrangement with the physical network controller (130). The physical network controller is configured to receive an indication for a minimum traffic capacity for the physical layer connection and configure said physical resources according to the received indication.

In a further embodiment of the second aspect the configured physical resources provide a variable traffic capacity physical layer connection and provide at least the indicated minimum traffic capacity.

In a further embodiment of the second aspect the physical network controller (130) is configured to report to the higher layer network controller (120) an indication of a traffic capacity for the physical layer connection.

In a further embodiment of the second aspect the resources configured by the physical network controller (130) are a first set of resources, and the physical network controller is further configured to: configure a second set of physical resources according to the indicated minimum traffic capacity and use the second set of physical resources for the physical layer connection when at least a part of the first set of physical resources is unavailable.

A third aspect of the disclosure provides a method in a network controller (120) for establishing a plurality of physical layer connections in a communications network (100), the communications network comprising a hierarchical arrangement of one or more network controller (120) and one or more physical network controller (130). The method comprising the network controller (120) transmitting (430) a request for a physical layer connection to a said physical network controller (130) wherein the request includes an indication of a minimum traffic capacity for the physical layer connection.

In a further embodiment of the third aspect the method comprises receiving (440) an indication of an available traffic capacity for the physical layer connection.

In a further embodiment of the third aspect the indication of the currently available best effort traffic part is received from a first physical network controller, the method further comprising transmitting (450) the indication to a second physical network controller.

In a further embodiment of the third aspect the method comprises reporting (460) the indication of an available traffic capacity to a customer network control node (110).

In a further embodiment of the third aspect the method comprises receiving (410) an indication from a customer network control node (110) for a minimum traffic capacity for a network connection, wherein the network connection corresponds to the physical layer connection.

In a further embodiment of the third aspect the method comprises translating (420) the received indication for a minimum traffic capacity for a network connection into the indication of a minimum traffic capacity for the physical layer connection.

A fourth aspect of the disclosure provides a network controller (120) in a communications network, the communications network comprising a hierarchical arrangement of one or more network controller (120) and one or more physical network controller (130). The network controller is configured to receive an indication for a minimum traffic capacity for a network connection and transmit a request for a physical layer connection to a said physical network controller (130). The request includes an indication for a minimum traffic capacity for a physical layer connection.

A fifth aspect of the disclosure provides a method in a customer network control node (110) for establishing a network connection in a communications network for a service offering, the communications network comprising a hierarchical arrangement of one or more customer network control node (110), one or more network controller (120) and one or more physical network controller (130). The method comprises determining (510) a need for a network connection to be established with a required bandwidth, wherein the required bandwidth comprises a minimum traffic capacity. The method includes transmitting (520) an indication of the minimum traffic capacity for the network connection to a said network controller (120).

In a further embodiment of the fifth aspect the method comprises receiving (530) an indication of an available traffic capacity for the network connection and adapting the service offering based on the received indication of an available traffic capacity for the network connection.

A sixth aspect of the disclosure provides a customer network control node (110) configured to establish a network connection in a communications network for a service offering, the communications network comprising a hierarchical arrangement of one or more customer network control node (110), one or more network controller (120) and one or more physical network controller (130). The customer network control node (110) is configured to determine a need for a network connection to be established with a required bandwidth for a service offering, wherein the required bandwidth comprises a minimum traffic capacity. The customer network node is further configured to transmit an indication of the minimum traffic capacity for the network connection to a said network controller (120), receive an indication of an available traffic capacity for the network connection and adapt the service offering based on the received indication of an available traffic capacity.

A seventh aspect of the disclosure provides an apparatus (600) for configuring physical resources to produce a physical layer connection in a communications network (100), the communications network (100) comprising a hierarchical arrangement of one or more network controller and one or more physical network controller, wherein the physical layer connection provides physical connectivity for a higher layer network connection controlled by the network controller. The apparatus comprises an External Interface Module (601) configured to receive an indication of a minimum traffic capacity for a physical layer connection and a Resource Configuration Module (602) configured to configure physical resources for the physical layer connection according to said indication.

In a further embodiment of the seventh aspect the apparatus (600) comprises an Internal Interface Module (604) wherein the Resource Configuration Module (602) is further configured to signal one or more parameters to a path computation element via the Internal Interface Module (604), based on the indication of a minimum traffic capacity.

In a further embodiment of the seventh aspect the apparatus (600) comprises a Resource Capacity and Status Reporting Module (603) configured to determine an available traffic capacity and report an indication of said available traffic capacity via the External Interface Module (601).

An eighth aspect of the disclosure provides an apparatus (800) for establishing a plurality of physical layer connections in a communications network, the communications network (100) comprising a hierarchical arrangement of one or more network controller and one or more physical network controller. The apparatus comprising: an Interface Module (801) configured to transmit and/or receive an indication of a minimum traffic capacity; a Network Domain Selection Module (802) configured to select a physical network domain to provide a physical layer connection; and a Network Service Control Module (803) configured to request a physical layer connection via the Interface Module (801) according to an indication of a minimum traffic capacity.

In a further embodiment of the seventh aspect the Interface Module (801) is further configured to receive a report indicating an available traffic capacity for the physical layer connection, and the Network Service Control Module (803) is further configured to: report the available traffic capacity to a customer network controller (110); and/or inform one or more other physical network domains of the available traffic capacity for the physical layer connection.

A ninth aspect of the disclosure provides an apparatus (1000) for establishing a network connection in a communications network, the communications network (100) comprising a hierarchical arrangement of one or more high layer network controller and one or more low layer physical network controller. The apparatus comprising: a Customer Service Control Module (1002) configured to determine a network connection to be established with a required bandwidth; an Interface Module (1001) configured to communicate with one or more network controller (120); and a Network Layer Control Module (1003) configured to indicate a minimum traffic capacity for a network connection, based on the required bandwidth.

A tenth aspect of the disclosure provides a physical network controller comprising a processor and a memory, the memory containing instructions executable by the processor whereby the physical network controller is operative to: configure physical resources to provide a physical layer connection in a communications network, wherein the physical layer connection provides physical connectivity for a higher layer network connection controlled by a higher layer network controller (120) in a hierarchical arrangement with the physical network controller (130); receive an indication for a minimum traffic capacity for the physical layer connection; and configure physical resources according to the received indication.

An eleventh aspect of the disclosure provides a network controller configured to establish a plurality of physical layer connections in a communications network, the communications network comprising a hierarchical arrangement of one or more network controller (120) and one or more physical network controller, the network controller comprising: a processor and a memory, the memory containing instructions executable by the processor whereby the network controller is operative to: transmit a request for a physical layer connection to a said physical network controller, wherein the request includes an indication of a minimum traffic capacity for the physical layer connection.

A twelfth aspect of the disclosure provides a customer network control node configured to establish a network connection in a communications network for a service offering, the communications network comprising a hierarchical arrangement of one or more customer network control node, one or more network controller and one or more physical network controller, the customer network control node comprising a processor and a memory, the memory containing instructions executable by the processor whereby the customer network control node is operative to: determine a need for a network connection to be established with a required bandwidth, wherein the required bandwidth comprises a minimum traffic capacity; and transmit an indication of the minimum traffic capacity for the network connection to a said network controller.

An thirteenth aspect of the disclosure provides a computer program for configuring physical resources associated with a physical layer connection in a communications network (100), the communications network (100) comprising a hierarchical arrangement of one or more network controller and one or more physical network controller, wherein the physical layer connection provides physical connectivity for a higher layer network connection controlled by a higher layer network controller, the computer program comprising computer code which, when run on processing circuitry of a physical network controller, causes the physical network controller to: receive an indication for a minimum traffic capacity of the physical layer connection; and configure said physical resources according to the received indication.

An fourteenth aspect of the disclosure provides a computer program for establishing a network connection in a communications network, wherein the communications network comprises a hierarchical arrangement of a plurality of physical network controllers and one or more network controllers, the computer program comprising computer code which, when run on processing circuitry of a network controller, causes the network controller to: receive an indication for a minimum traffic capacity for a network connection; request a physical layer connection wherein the request includes an indication for a minimum traffic capacity for a physical layer connection, wherein the indication is based on the received indication for a minimum traffic capacity for a network connection and the physical layer connection provides physical resources for the requested network connection.

An fifteenth aspect of the disclosure provides a computer program for providing a customer network service in a communications network, wherein the communications network comprises a hierarchical arrangement of a plurality of physical network controllers, one or more network controllers, and one or more customer network controllers, the computer program comprising computer code which, when run on processing circuitry of a customer network controller (110), causes the customer network controller (110) to: determine a need for a network connection to be established with a required bandwidth, wherein the required bandwidth comprises a minimum traffic capacity; and transmit an indication of the minimum traffic capacity for the network connection to a network controller (120).

An sixteenth aspect of the disclosure provides a carrier containing a computer program comprising instructions which, when executed on at least one processor, cause the at least one processor to carry out the method according to any one of methods disclosed herein.

BRIEF DESCRIPTION OF THE DRAWINGS

Embodiments of the disclosure will now be described, by way of example only, with reference to the accompanying drawings, in which.

DETAILED DESCRIPTION

Figure 1:
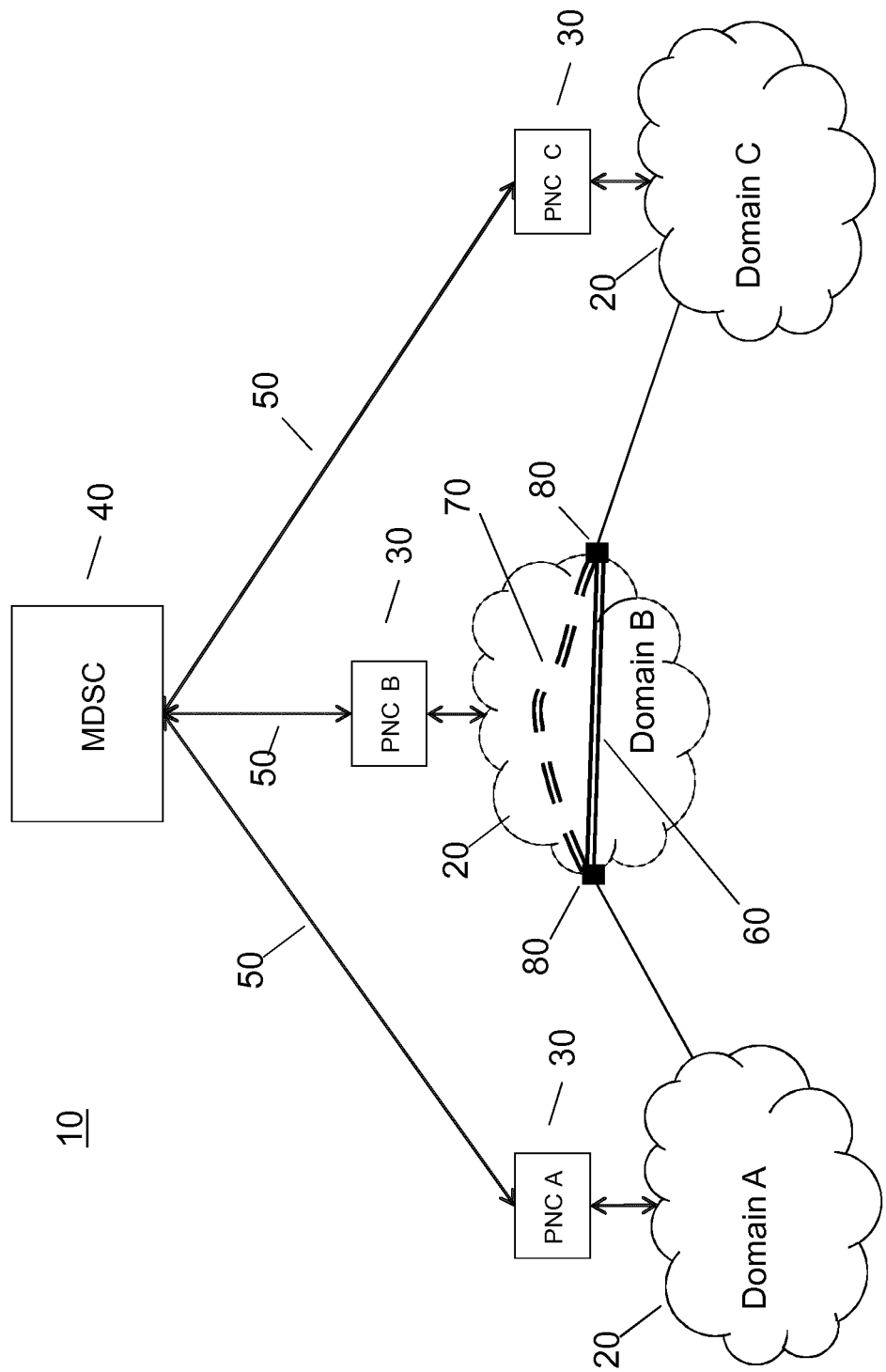
FIG. 1 shows an overview of an exemplary communication network.

The following disclosure is based on the ACTN framework, for example as described above, but it will be appreciated by those skilled in the art that the aspects disclosed are not limited to such an architecture or system.

Elastic optical networking (EON) has emerged in recent years as a promising solution for implementing flexible bandwidth channels that match the allocated bandwidth with the traffic demand using advantageously the spectrum allocation enabled by the flexible grid. In some aspects, the term elastic refers to the optical spectrum being divided up flexibly and/or transceivers which can generate elastic optical paths, e.g. paths with variable bit rates.

Rate-tunable optical interfaces suggest also a protection approach where working and protection paths have different optical line rates because best-effort data traffic has been dropped in case of failure. Other advantages of elastic optical networking are related to power saving and reduction of the inventory i.e. "one size fits all" for easier management of the spare parts.

Examples of EON may be based on flexible line interfaces where the wavelength (or set of wavelengths) can be software-controlled to provide aggregate capacity e.g. from 40 to 140 GBit/s by compromising the capacity with reach and spectral efficiency.

EONs may utilize DSP-assisted 28-32 GBaud digital coherent transmission for 40G/110G, and it is assumed to be the main technology for 140G and 1T systems. For example, the EON may keep constant the symbol rate of a single wavelength and change the modulation format to achieve various capacities, e.g. from approximately 50G for DP-BPSK to 110G for DP-QPSK to 120G for DP-16QAM. Aggregate line rates beyond 120G may exploit 2 to 8 wavelengths to achieve 140G to 1T, according to the requested reach. In case of multi-wavelength line interfaces, some examples may selectively allocate the symbol rate to each carrier and even switch off the unused sub-carriers if this is advantageous in terms of spectral or power efficiency. These parameters of an EON line interface are software configurable and compatible with an SDN system.

Elastic Physical Network

The embodiments described may use an Elastic Physical Network (EPN), of which an EON is a specific example. The EPN comprises physical resources where the transceivers can generate elastic paths, e.g., paths with variable bit rates. Other examples of EPN are: microwave links where the bit-rate is adapted to cope with weather conditions, radio access networks where the bit-rate can be changed according to location, speed or other properties of the end nodes; Visible Light Communication (VLC) systems where the bit-rate depends on ambient conditions and distance; and adaptive broadband wireless systems, for example 3GPP Long Term Evolution (LTE) and WIMAX use adaptive modulation, coding schemes and sub-carriers.

Any aspect of the disclosure may use an elastic capability of the EPN. In some examples, the elastic capability of the physical resources is due to an elastic reconfiguration of nodes, for example controlling (varying) one or more of symbol rate, modulation format, channel spacing and/or other parameter. In some examples, the elastic capability of a server node uses a transponder which is configured to vary line capacity. In some aspects, the elastic capability of a server node relates to a network element (e.g. an optical cross-connect) which is able to vary a bandwidth of a switching window, varying the bandwidth of the elastic optical path. In some examples, the elastic capability utilizes arbitrary bandwidth channels (flexpath), or any elastic optical networking method. In some examples, the elasticity is provided by bandwidth variation of a Label Switched Path (LSP) in a Multiprotocol Label Switching (MPLS) network. In some examples, the elasticity is provided by using one or more alternate paths.

In examples of the disclosure, an EPN is applied to the ACTN framework. The PNC is able to control and therefore provide physical layer connections with variable bit rates. However, in order for the higher layer network controllers to benefit from an EPN, protocol extensions and adaptations are required. Such extensions are disclosed to improve physical resource management.

Figure 2:
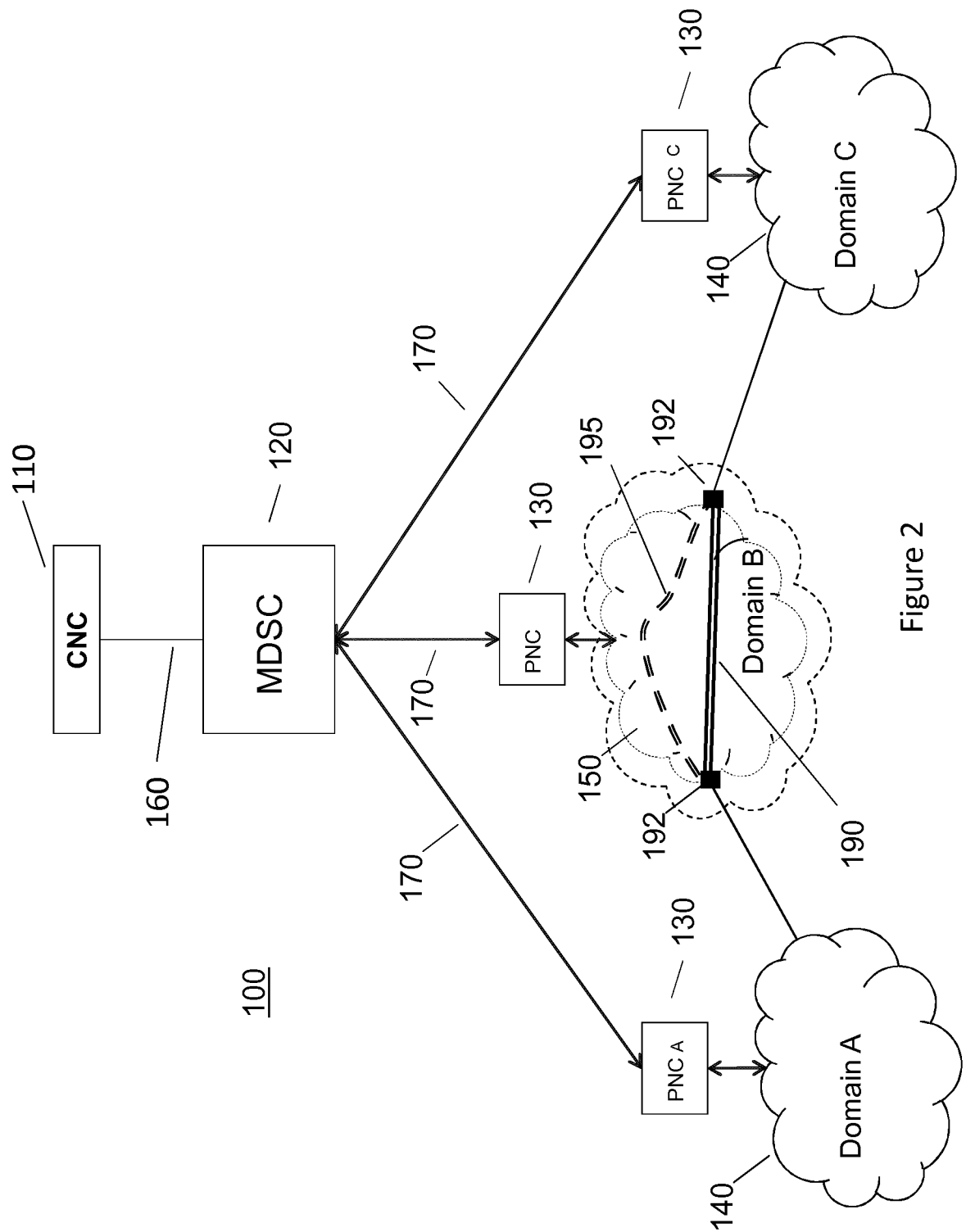
FIG. 2 shows an example communication network according to an embodiment of the disclosure.

Referring to FIG. 2, a communications network 100 is described according to one or more embodiments. The communications network 100 comprises a hierarchical arrangement of one or more high (or higher) layer network controller 120 (e.g. MDSC) and one or more physical network controller 130 (e.g. PNC). In some aspects, the PNC 130 may be considered as a low or lower level network controller, i.e. lower than the MDSC 120. For examples, the layer network controller 120 may control a summarized or virtualized view of the network, and/or control the physical resources only through the lower level network controller 130.

The communications network 100 comprises one or more customer service level control node, such as a Customer Network Controller (CNC) 110. A CNC may provide services for a customer through network slicing of the hierarchical communications network 100.

The physical network resources, as controlled by a PNC in ACTN framework, must provide certain level of service and reliability as requested via the signalling protocols over the standardized interfaces such as a CNC-MDSC Interface (CMI) and MDSC-PNC Interface (MPI).

Each PNC 130 controls the physical resources in its domain 140, 150. A CNC 110 communicates with one or more MDSC 120 via a CMI 160; a MDSC 120 communicates with one or more PNC 130 via a MPI 170. In some examples a PNC communicates with a domain control element, e.g. a Path Computation Element (PCE) over an internal domain interface 180.

The CNC 110 may instantiate the Virtual Network (VN) via the CNC-MDSC Interface (CMI). In turn, MDSC 120 dispatches relevant information to one or more involved PNC 130 via the MDSC-PNC interface (MPI).

In an embodiment according to FIG. 2, PNC-B 130 controls an elastic physical network within a domain 150. For example, the bit rate for a given path may be varied, for example for an elastic optical network providing DWDM. In some examples the wavelengths may be fixed and the capacity varied through modulation. In other examples the EON may involve sub-wavelength transponders which allocate the varying bandwidth requirements to a segmented wavelength within a flexible spectrum assignment.

The PNC-B 130 receives a request to configure physical resources to provide a physical layer connection for a higher layer service. The higher layer from the PNC perspective is the network layer controlled by an MDSC 120. This may alternatively be termed the layer above the physical layer connection. In this respect the MDSC controls a higher layer network connection with respect to the PNC and the PNC provides a physical layer connection for the layer above the physical layer connection, herein termed the higher layer network connection, which is controlled by the higher layer network controller, for example the MDSC 120. The request to configure physical resources can for example result in a physical layer connection being a physical network path 190 or tunnel between two identified end points 192. In the ACTN framework of FIG. 2 such a request is received, from the MDSC 120 as the higher layer network controller, over the MPI 170.

The PNC 130 receives an indication for a minimum traffic capacity for the physical layer connection. The PNC configures physical resources to provide the physical layer connection according to the received indication of the minimum traffic capacity. Configuration may include allocating physical resources such that certain elements of the physical network are dedicated to the physical layer connection. In other examples the configuration involves providing parameters to a software configurable interface which adapts the physical network layer to provide the required connectivity, i.e. SDN applications. The configured physical resources may provide a physical layer connection or path with variable traffic capacity which may increase or decrease due to certain network conditions but provides at least the indicated minimum traffic capacity. The variable traffic capacity may be provided by an elastic network. For example, the connection guarantees not to drop below this indicated minimum traffic capacity.

The minimum traffic capacity may therefore be defined as a guaranteed bit rate to be provided by the physical network layer for a higher layer service. In some examples, the guaranteed bitrate relates to a premium service or premium part of the service offering. In some examples the minimum traffic capacity indication may be received as part of a request to configure the physical resources to provide the physical layer connection for the higher layer service. In some examples this may be termed a request to establish a physical network path. In other examples a separate message or indication may be used to convey the minimum traffic capacity indication.

In some examples the indication received by the PNC 130 from the MDSC 120 for a minimum traffic capacity comprises a portion of a maximum desired traffic capacity. The indication may comprise a maximum desirable bit rate, for example the physical resources are to provide 120 Gb/s with a minimum or guaranteed traffic capacity of 80 Gb/s. In some examples the minimum or guaranteed traffic part requirement may be a percentage of the requested maximum desired traffic capacity, for example 40% of a requested 120 Gb/s service. This provides the advantage that the physical network controller is aware of how a higher layer node actually intends to use the physical network path or tunnel. This is particularly useful when performing restoration at the PNC layer and no feasible path is available between the two endpoints. Indicating the amount of premium or guaranteed traffic being carried over said tunnel, the PNC can provision a restoration tunnel with reduced bit rate which can reach longer distances and restore at least the indicated minimum traffic capacity, e.g. the premium traffic.

In other examples the PNC 130 may also receive an indication for the required best effort traffic part. Again this may be expressed as specific bit rate or bandwidth or it may be expressed as a percentage of the total requested service, for example 60% of a requested 120 Gb/s service is requested to be best effort traffic. Aspects of the disclosure provide an indication to the physical network controller 130 of an amount of traffic to be guaranteed and an amount of traffic which is "best effort", in any suitable format. Best effort traffic may not be carried by the network if there is not capacity to do so. Best effort traffic may only be carried by the network if there is sufficient remaining capacity after the guaranteed traffic has been allocated capacity.

In the example described referring to FIG. 2, the PNC 130 is the controller of the physical resources within its domain 150 which can provide variable bit rate physical network paths or tunnels due to the elastic physical network. The configuration of physical resources as requested by the network controller 120 (e.g. via the MPI) causes the physical network path to be configured such that the indicated minimum traffic capacity is satisfied. In some examples this is achieved by direct control of the resources, for example in an optical network through the selection of transponders and optical switches. In other examples the PNC 130 may signal the requirements to another entity responsible for configuring the physical path resources, for example a Path Computation Element (PCE). The configured path is in this case elastic in nature and may provide an additional best effort traffic part which can be varied in response to various network conditions, whilst still providing the guaranteed, minimum traffic capacity.

A network condition which triggers a variation of the physical network path capacity may be a failure of hardware equipment such as a transponder or it could be a physical link such as WDM link being completely severed. The network condition may be a degradation of the physical path, for example due to interference or power levels being dropped. The network condition may also be a restoration of failed devices or restored physical links such that the physical network path capacity improves. In other examples the network condition which enables the physical network path to improve could be reduced interference or restored power levels.

The PNC 130 may report to the higher layer network controller 120, for example over the MPI 170, the available minimum traffic capacity. Optionally, any additional best effort traffic capacity is also provided by the configured physical resources, for the physical layer connection, i.e. the capacity which can be supported between its endpoints. The higher layer network controller, such as the MDSC 120 can cascade this information to other PNCs, e.g. PNC-A 130 and PNC-C 130 to enable the others PNCs in the traffic chain to optimize their physical network resource allocations.

The PNC 130 can inform, via the MPI 170, the MDSC 120 that there is residual capacity which can be offered to the customer but with poorer SLAs. In other words, the same end points 192 can be connected by bandwidth W2 with tolerance to further faults, with tolerance to single fault by bandwidth W1 and unprotected with bandwidth W0. This multi fall-through approach enables, for example, to offer for example three grades of service where: W2<W1<W0.

The PNC 130 may additionally inform the MDSC 120 of improvements to the connectivity, e.g. as a result of a network condition improving the performance of the physical resources or that in order to provide the indicated minimum traffic capacity the physical network may provide an additional capacity. For example, in EON the allocation of a 40G service composed of all-premium traffic may require the provisioning of a wavelength of a minimum bit-rate of 50G. In this case there is an extra premium-grade 10G capacity for the higher network layers.

In some examples the PNC 130 provisions a set of physical resources which provide a redundancy path which may be longer and/or offer lower available bit rate than the allocated set of physical resources as requested. For example the requested tunnel provides a maximum desired bit rate, of which part of the requested bit rate is a minimum traffic capacity. However, the provisioned redundancy path provides at least the indicated minimum or premium traffic capacity. In other examples the PNC 130 establishes a new physical network path 195 or tunnel between the two end points 192 on-the-fly, when some or all of the set of physical resources of the first path 190 become unavailable.

With at least some of the disclosed embodiments it becomes possible to restore a higher quantity of premium traffic because decreasing the bit rate requested to the interfaces of the physical layer is very likely to reach longer distances. In other words, reaching the same end points 192 through longer paths increases the number of alternate path and successful restoration.

Restoring only the premium traffic via longer paths is often feasible with a reduced number of regenerators (or no regenerators at all). This means obviously less physical cards to be deployed, less hardware kept in stand-by, managed and powered, effectively reducing CAPEX. Example of "regenerators" are transponders in back-to-back arrangement in the EON or daisy-chained microwave links.

The above mentioned indication of the usage of the requested service applies also to higher layer network interfaces such as a the CMI 160, between a Customer Network Controller (CNC) 110 and an MDSC 120. At the higher levels of abstraction the network path may be a virtual network path between two nodes with the CNC 110 may be unaware of the physical domains and the physical network controllers involved. A CNC 110 may indicate over the CMI 160 a desired service wherein the indication includes a minimum traffic capacity, i.e. a bitrate which must be guaranteed. The CNC 110 provides this indication to a MDSC and the indication may be included in a request to establish a network path or tunnel (e.g a VN service). In other examples the indication may be provided separately from a request to establish the network path.

The MDSC 120 is a network controller for establishing a plurality of physical layer connections in the hierarchical communications network. The communications network may be considered as having a hierarchical control, i.e. a plurality of layers of controllers communicating control messages between each other. In some examples the MDSC may determine the minimum required traffic capacity itself from other QoS parameters or SLA parameters that received from higher layer network nodes such as a CNC 110. The Service Level Agreement may reflect certain service offerings which may comprise minimum levels such as a minimum traffic capacity. As part of a service offering, various traffic mixes may differ, for example for different types of data transmissions, voice class traffic, messaging services, or the service offering may be aggregated into a single bandwidth requirement. In further examples the service offering includes a resiliency scheme such as a tolerance to a certain number of faults in the data plane. Examples of such faults are link cuts or signal interference. The MDSC determines which PNC it needs to contact to provide the physical resources to satisfy the higher layer network connection.

The MDSC sends a request to the selected PNC, for example over a MPI, to provide a physical layer connection, the request includes an indication of a minimum traffic capacity for the physical layer connection. The MDSC 120 may translate an indication received from the CNC 110 over the CMI 160 into a format required by the protocol on the MPI to provide the indication of the minimum traffic capacity to the associated PNC 130. For example, the CMI 160 may indicate the minimum or guaranteed traffic capacity as a percentage of an indicated desired maximum traffic capacity for the network path and the MDSC 120 may translate this into physical bitrates for the indication of the minimum traffic capacity over the MPI 170.

The MDSC 120 may receive an indication from the PNC 130, e.g. in a protocol message over MPI, indicating an available traffic capacity for the allocated physical layer connection. The requested minimum traffic capacity is assumed to be provided if a positive response is received to the initial request however in some examples the indication may include confirmation that the minimum traffic capacity is met. This confirmation may be explicitly indicated or implicitly indicated by virtue of the indication of available traffic capacity being greater than the minimum traffic capacity as indicated by the MDSC 120. The indication of available traffic capacity may further comprise additional guaranteed traffic capacity and/or available best effort traffic capacity. The MDSC 120 may communicate the received available traffic capacity with one or more other PNC 130 controlling adjacent domains, i.e. preceding and succeeding endpoints of the network path. For example, PNC-A and PNC-B in FIG. 2.

The MDSC 120 may also subsequently report the received available traffic capacity to a customer network control node, for example to a CNC 110 in a protocol message over a CMI. The CNC may then provide the additional traffic capacity to the customer.

Figure 3:
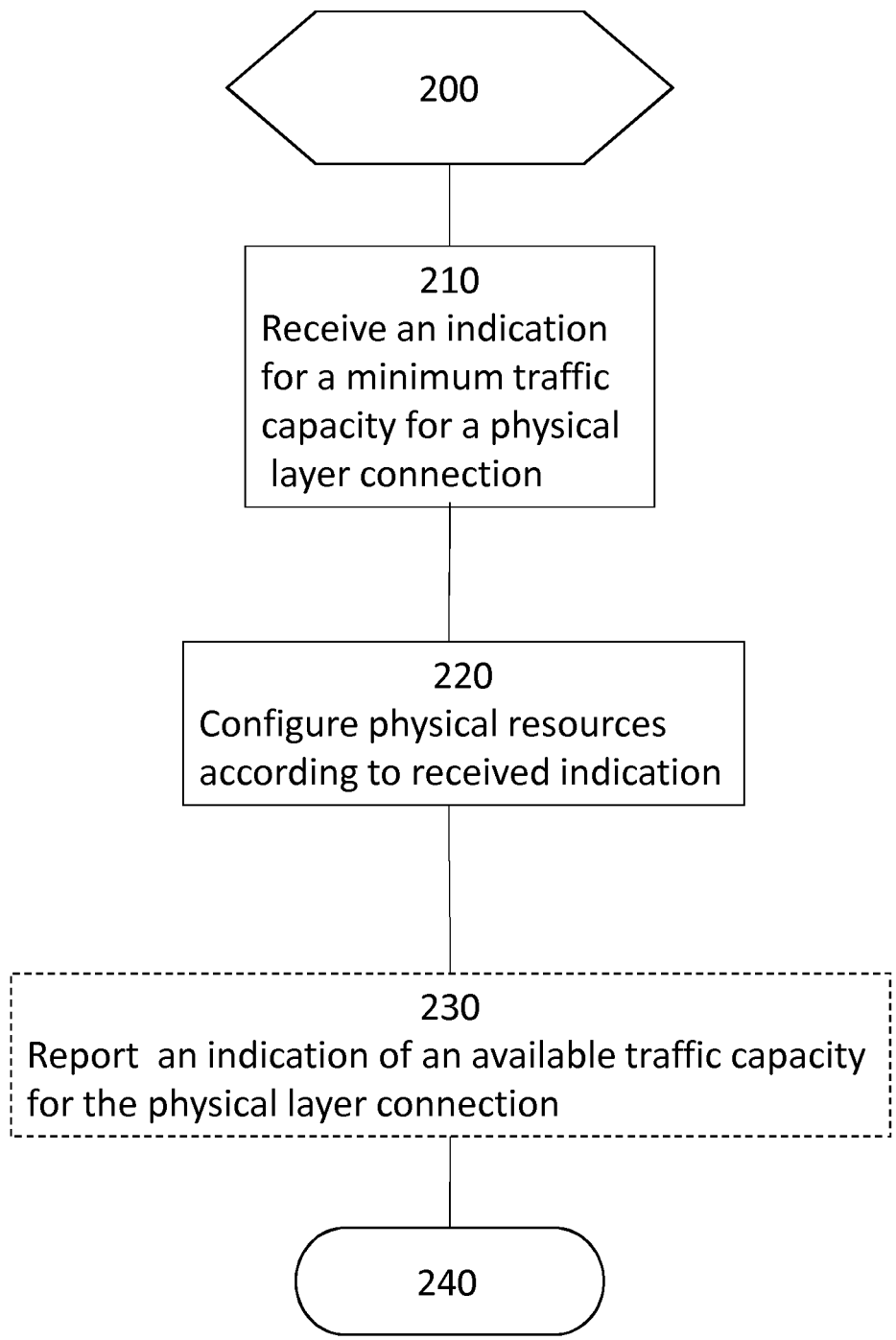
FIG. 3 shows an example of a method according to an embodiment of the disclosure.

An exemplary method in a physical network controller is described in FIG. 3. The method starts at 200, and the physical network controller receives at 210 an indication for a minimum traffic capacity for a physical layer connection. The indication may be received in a protocol message over an MPI 170. The physical network controller 130 may receive the indication at the same time as receiving a request to establish a physical layer connection. The establishment of a physical layer connection, for example a physical network path or tunnel between two endpoints, may involve the allocation of physical resources to a higher layer network connection.

The physical network layer configures at 220 the physical resources in accordance with at least the indicated minimum traffic capacity, and if possible, physical resources for all the requested traffic capacity. Depending on the type of physical resources and how they are allocated this configuration may result in spare capacity, additional to the guaranteed traffic. At least the indicated minimum bit rate (guaranteed) traffic capacity is provided. In some examples the physical resources are configured to provide a guaranteed (or premium) capacity and also a portion of best effort traffic capacity.

The physical network controller 130 optionally reports at 230 an indication of a traffic capacity for the allocated physical layer connection. The indication may be in a report which is a protocol message over an MPI. The indication may be confirming the guaranteed traffic capacity as being the indicated minimum traffic capacity. In other examples such an indication is deemed not necessary as the request would be considered not satisfied if the minimum traffic capacity could not be allocated. In such a situation the physical network controller may alternatively issue a negative response to the request. In some examples a failure reason may include an indication of a traffic capacity which is the available traffic capacity, where the available capacity is less than the indication of the minimum traffic capacity received by the physical network controller. Other examples of an indication of a traffic capacity for the physical layer connection are the maximum available traffic capacity which is greater than the indicated minimum traffic capacity. In some examples this may be an additional guaranteed traffic capacity over and above the received minimum traffic capacity indication. In other examples this may be an additional best effort traffic capacity where the actual amount of capacity may vary, anywhere between this amount and zero, over time. In further examples a combination of any of the types of traffic capacity indications may reported. The physical network controller may report such traffic capacity indications multiple times during the life of the physical layer connection, as network conditions occur which may improve or reduce such traffic capacity values. The method terminates at step 240.

Figure 4:
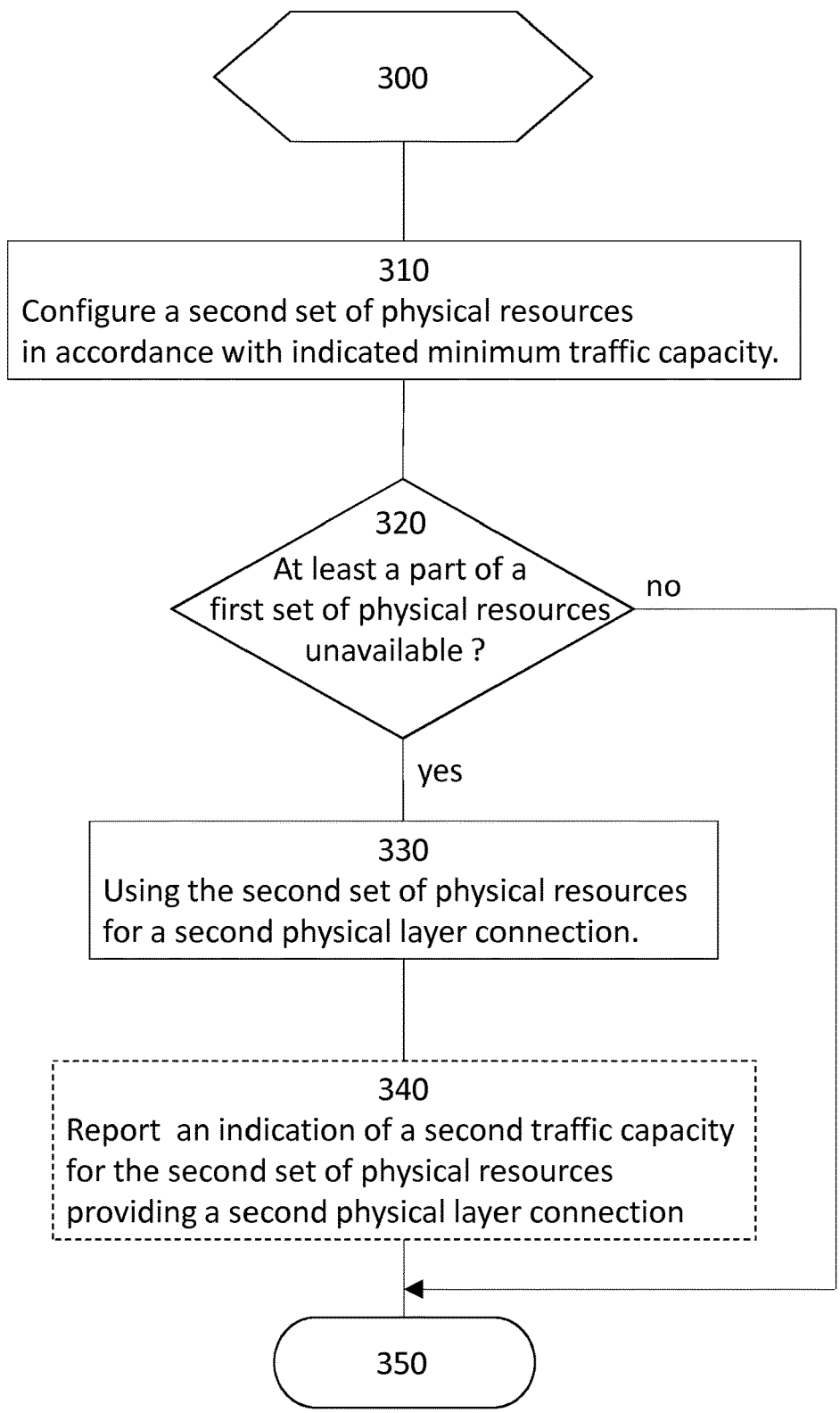
FIG. 4 shows an example of a method according to a further embodiment of the disclosure.

In further embodiment of the method as shown in FIG. 4, starting the method at step 300, the physical network controller configures at step 310 a second set of physical resources in accordance with the indicated minimum traffic capacity. In 320, a determination is made of whether at least a part of the first set of physical resources is unavailable, e.g. due to a node or link failure. If so, a second set of physical resources is configured, e.g. an alternative path in the domain. In some examples, the configuring of said second set of physical resources involves allocating 330 physical resources to a second physical layer connection between the two endpoints 192 to provide a restoration path 195 in the event that a first set of physical resources suffers a partial or total failure. In other examples configuring a second set of physical resources may involve reserving the capacity as part of a total traffic capacity management without allocating any physical resources in a dedicated way to a physical layer connection. In this way the physical resources are provisioned to ensure that there is capacity for a failure but for example while the first set of physical resources are still available the second set of physical resources provide additional best effort traffic capacity. In 340, the physical network controller optionally reports an indication of a second traffic capacity for the second set of physical resources providing a second physical layer connection. Thus, a higher layer network controller (e.g. MDSC) is aware of the capacity of the alternative connection, and can configure alternative domains accordingly. The method ends at 350.

Figure 5:
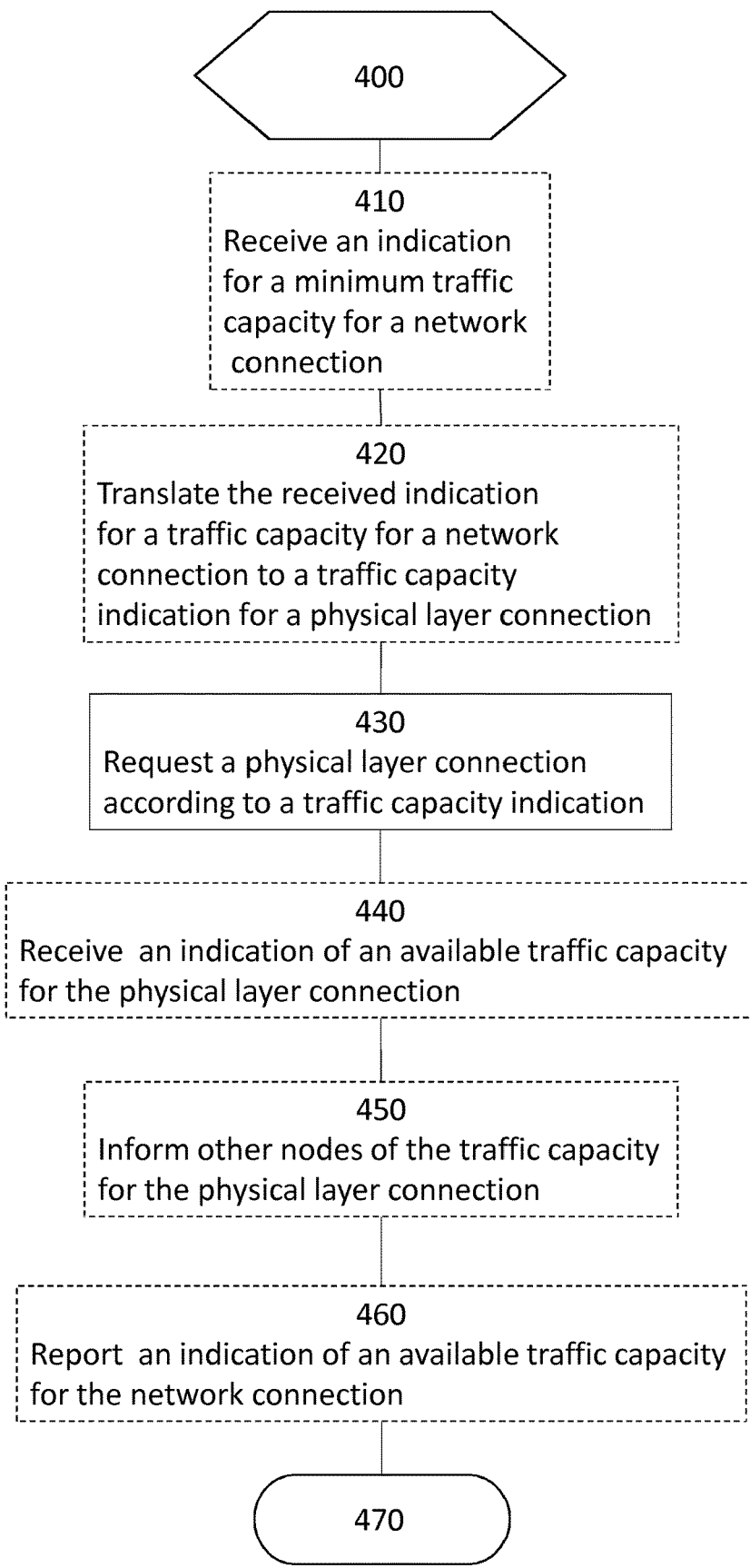
FIG. 5 shows an example of a method according to a further embodiment of the disclosure.

FIG. 5 is an exemplary method in a network controller 120 which performs the functions of a network controller of a hierarchical communications network. The network controller in the ACTN framework is an MDSC 120; the method is thus described in these terms although the disclosure shall not be limited by the terms.

The method starts at 400 and at step 410 the MDSC 120 may optionally receive an indication for a minimum traffic capacity for a network connection for a higher layer service. The indication may be received in a protocol message over a CMI. The indication may be received in a request to establish the network connection. In other examples the indication may be received independently from a request to establish a network connection. The request for the establishment of a network connection may be received from a CNC 110. For example, the MDSC receives a request to provide a 200 Gb/s service. In some examples the request defines the end points or network nodes between which the service is required. In some examples the network connection is a VN. The request may include criteria for the failure of the connection, for example that the minimum traffic capacity must survive a single link failure (e.g. severed physical link). In some examples the indication includes a maximum desired traffic capacity.

The indication may be expressed as a percentage of the maximum desired traffic capacity, for example 40% of the requested service bitrate shall be guaranteed. In other examples the indication of the minimum traffic capacity is expressed as a bit rate, e.g. 40 Gb/s shall be guaranteed. In some examples the indication includes a best effort traffic capacity. In other examples a best effort traffic capacity is deduced from the indicated minimum traffic capacity and a desired traffic capacity. The MDSC may optionally translate at step 420 the received indication over the CMI to another format to send over the MPI. For example, the received minimum traffic capacity indication may be a percentage of a maximum desired traffic capacity for a requested network service and the indication to be sent over the MPI is expressed as a minimum guaranteed bitrate value.

In other examples the MDSC derives the minimum traffic capacity itself based on other factors, for example QoS or SLA parameters. The MDSC selects a physical network controller to provide the physical resources required for the higher layer network connection. At 430 the MDSC sends a request to the selected physical network controller indicating the minimum traffic capacity for a physical layer connection. The indication may be in a protocol message over an MPI.

The MDSC may optionally receive at 440 a report providing an indication of an available traffic capacity. The report may be a protocol message over an MPI. The report may be received in response to the indication for a minimum traffic capacity. In other examples the report is received at some time later during the life of the physical layer connection. Multiple reports may be received over the life of the physical layer connection as the available traffic capacity varies over time. The available traffic capacity may indicate that the minimum traffic capacity is satisfied. In other examples the available traffic capacity may indicate a guaranteed traffic capacity which exceeds the minimum traffic capacity previously indicated to the physical network controller. In further examples the available traffic capacity includes an indication of a best effort traffic capacity. The MDSC may use this information at 450 to inform other nodes in the network connection of the available traffic capacity for the physical layer connection. For example, physical layer controllers controlling physical resources in adjacent domains. This provides the advantage that physical network controllers in control of physical layer connections forming the end to end physical connection can adapt their physical resources to match the available traffic capacity in other domains.

The MDSC may at 460 report an indication of an available traffic capacity to a higher layer, for example a CNC, when receiving the indication from the physical network controller of the available traffic capacity for the physical layer connection. The report may be a protocol message over a CMI. The indication of an available traffic capacity may be expressed in the same forms as described above for the indication received from the physical network controller. In other examples the indication may be a translation of the indication received from the physical network controller. The translation may be required to comply with different protocol syntax or content between a protocol over an MPI and a protocol over a CMI. The method terminates at 470.

Figure 6:
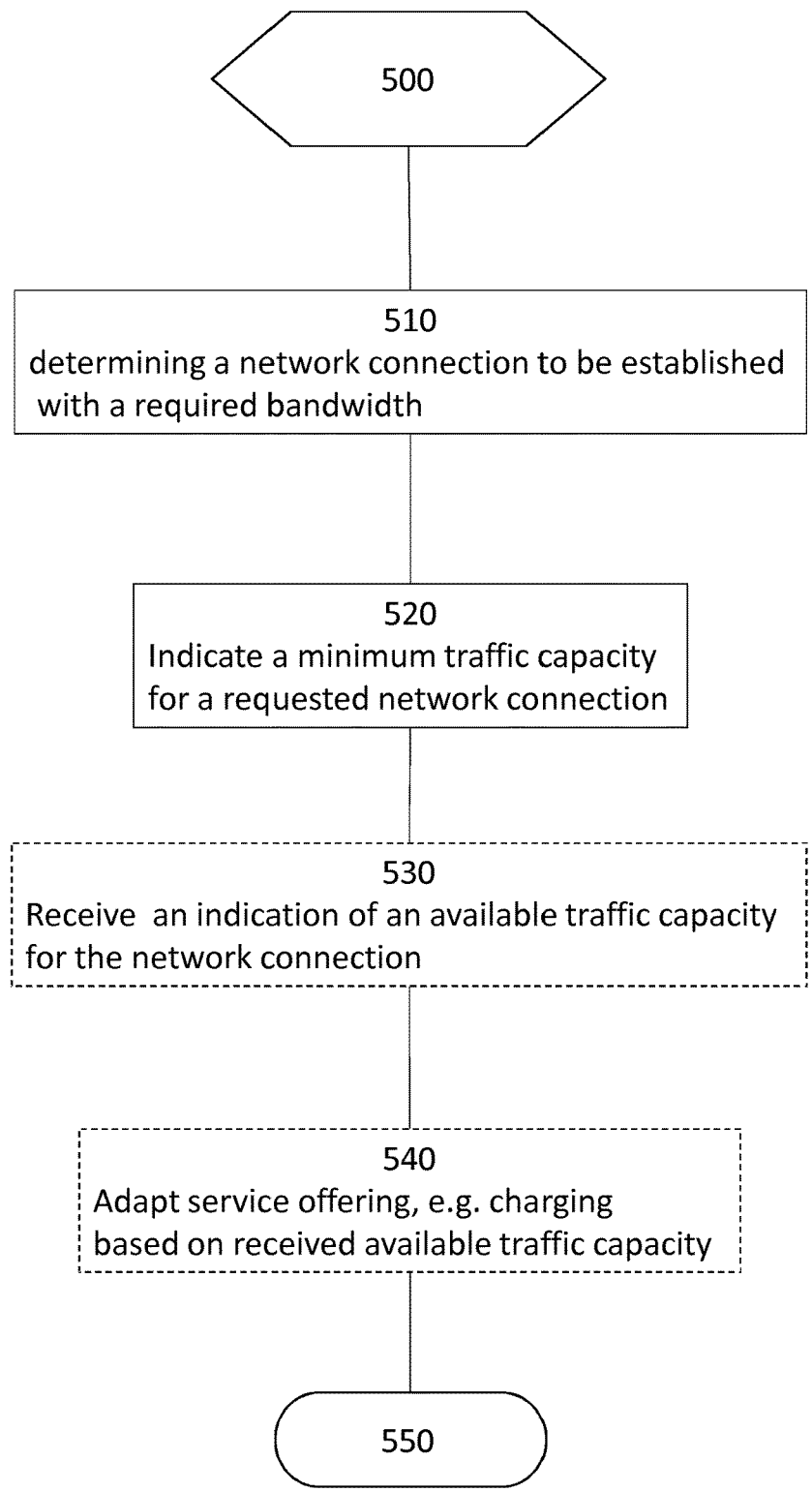
FIG. 6 shows an example of a method according to a further embodiment of the disclosure.

FIG. 6 shows a method in a customer network control node which is, for example, part of a customer service layer of a hierarchical network architecture, e.g. a CNC 110 according to the ACTN framework. The method begins at 500, the CNC determines at 510 that a network connection is to be established for a service offering with a required minimum bandwidth. At 520 the CNC indicates a minimum traffic capacity for the network connection to be established. The network connection may represent a virtual network connection. The indication may be in a protocol message over a CMI. The indication may be sent as part of a request to establish the network connection. In other examples the indication may be sent independently from a request to establish the network connection. The request for the establishment of the network connection may be sent to an MDSC. For example, the CNC sends a request to provide a 200 Gb/s service to an MDSC. In some examples the request defines the end points or network nodes between which the service is required. The request may include criteria for the failure of the connection, for example that the minimum traffic capacity must survive a single link failure (e.g. severed physical link). The request may include criteria for the failure of the connection, for example that the minimum traffic capacity must survive a single link failure (e.g. severed physical link). In some examples the indication includes a maximum desired traffic capacity. The indication may be expressed as a percentage of the maximum desired traffic capacity, for example 40% of the requested service bitrate shall be guaranteed. In other examples the indication of the minimum traffic capacity is expressed as a bit rate, e.g. 40 Gb/s shall be guaranteed. In some examples the indication includes a best effort traffic capacity. In other examples a best effort traffic capacity is deduced from the indicated minimum traffic capacity and a desired traffic capacity. The CNC may optionally receive at 530 a report indicating an available traffic capacity for the network connection. The report may be a protocol message over a CMI. The available traffic capacity may indicate that the minimum traffic capacity is satisfied. In other examples the available traffic capacity may indicate a guaranteed traffic capacity which exceeds the minimum traffic capacity previously indicated over the CMI to the MDSC. In further examples the available traffic capacity includes an indication of a best effort traffic capacity. The CNC may optionally at 540 adapt the service offering based on the indication of an available traffic capacity. The service offering may include different traffic capacities with differential pricing depending on whether the service includes, for example best effort traffic, the requested guaranteed traffic capacity and/or additional guaranteed traffic capacity. The CNC may adapt the service offering to offer differentiated pricing. For example, the requested guaranteed bitrate, an additional guaranteed bitrate and a best effort bitrate may be each be allocated a different tariff. The method terminates at 550.

Figure 7:
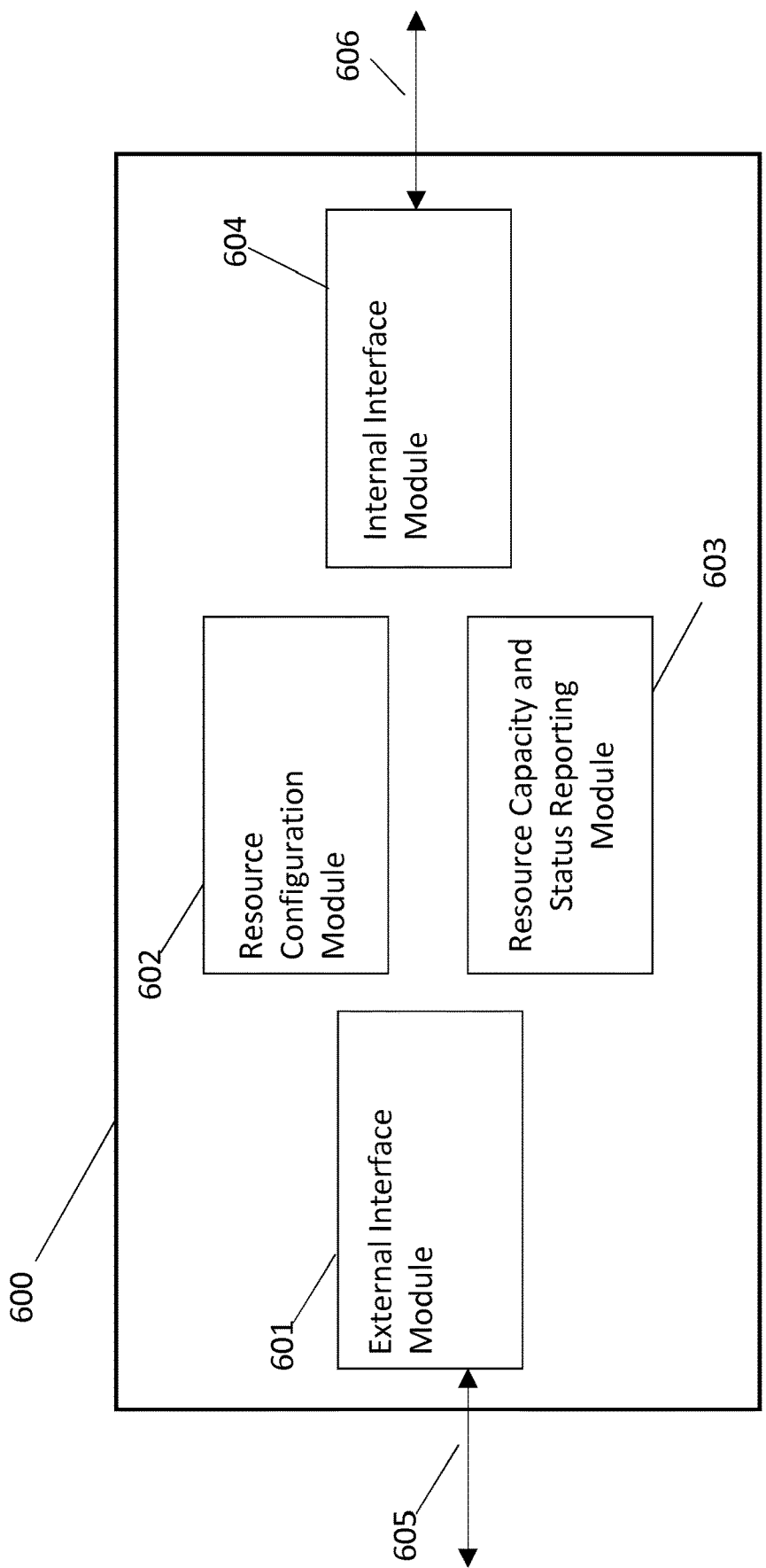
FIG. 7 shows an example of an apparatus according to an embodiment of the disclosure.

In FIG. 7 an apparatus 600 for configuring physical resources in a hierarchical communications network domain is shown, corresponding to a physical network controller 130, or part thereof. The apparatus 600 comprises an External Network Interface for communicating with a network controller 120, for example an MDSC. The External Interface Module 601 is configured to receive an indication of a minimum traffic capacity for a physical layer connection. The External Interface Module 601 may support a protocol compliant with an MPI 605 from an MDSC. The apparatus 600 comprises a Resource Configuration Module 602 for configuring or causing the configuring of physical resources associated to a physical layer connection. The Resource Configuration Module 602 is configured to configure physical resources for a physical layer connection according to said indication. In some arrangements the apparatus 600 further comprises an Internal Interface Module 604 for communicating with internal domain control elements, for example a PCE. In some arrangements the Resource Configuration Module 602 is further configured to configure physical resources for a physical layer connection using interface 606 according to said indication by sending one or more parameters to a path computation element via the Internal Interface Module 604, based on the indication of a minimum traffic capacity.

In some arrangements the apparatus 600 further comprises a Resource Capacity and Status Reporting Module 603 configured to determine an available traffic capacity and report an indication of said available traffic capacity via the External Interface Module 601.

Figure 8:
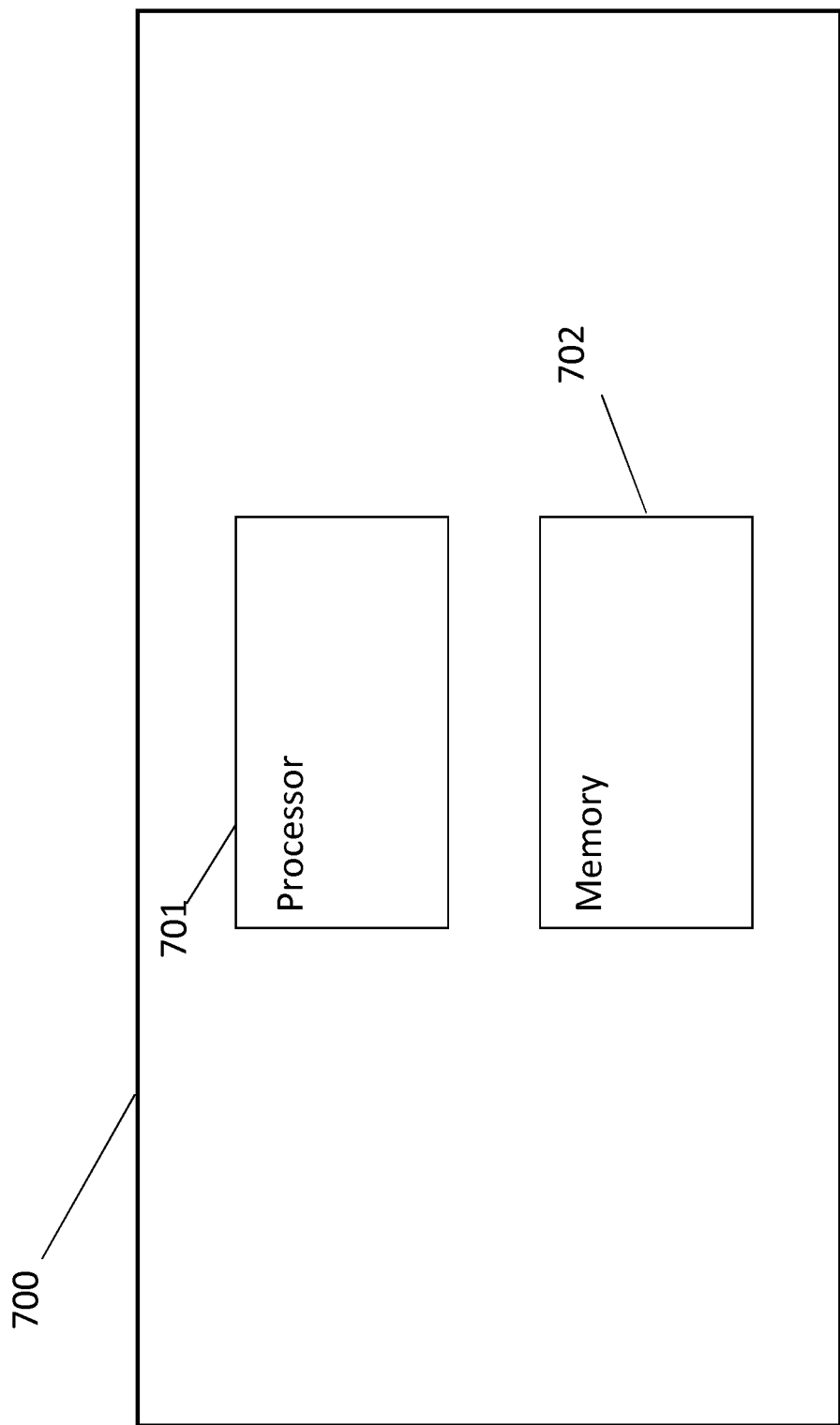
FIG. 8 shows a further example of an apparatus according to an embodiment of the disclosure.

Referring to FIG. 8, the figure shows an example physical network controller 700, for example a PNC 130, or part thereof. The physical network controller 700 comprises a processor 701 and a memory 702. The memory contains instructions executable by the processor. The physical network controller 700 is operative to implement the method described in any example.

In some aspects, the memory 702 contains instructions executable by the processor, whereby the physical network controller is operative to implement any example of the disclosure.

In an embodiment, the External Interface Module 601, Resource Configuration Module 602, the Resource Capacity and Status Reporting Module 603 and Internal Interface Module 604 described above, or any example described, are implemented as a computer program running on the processor 701.

Figure 9:
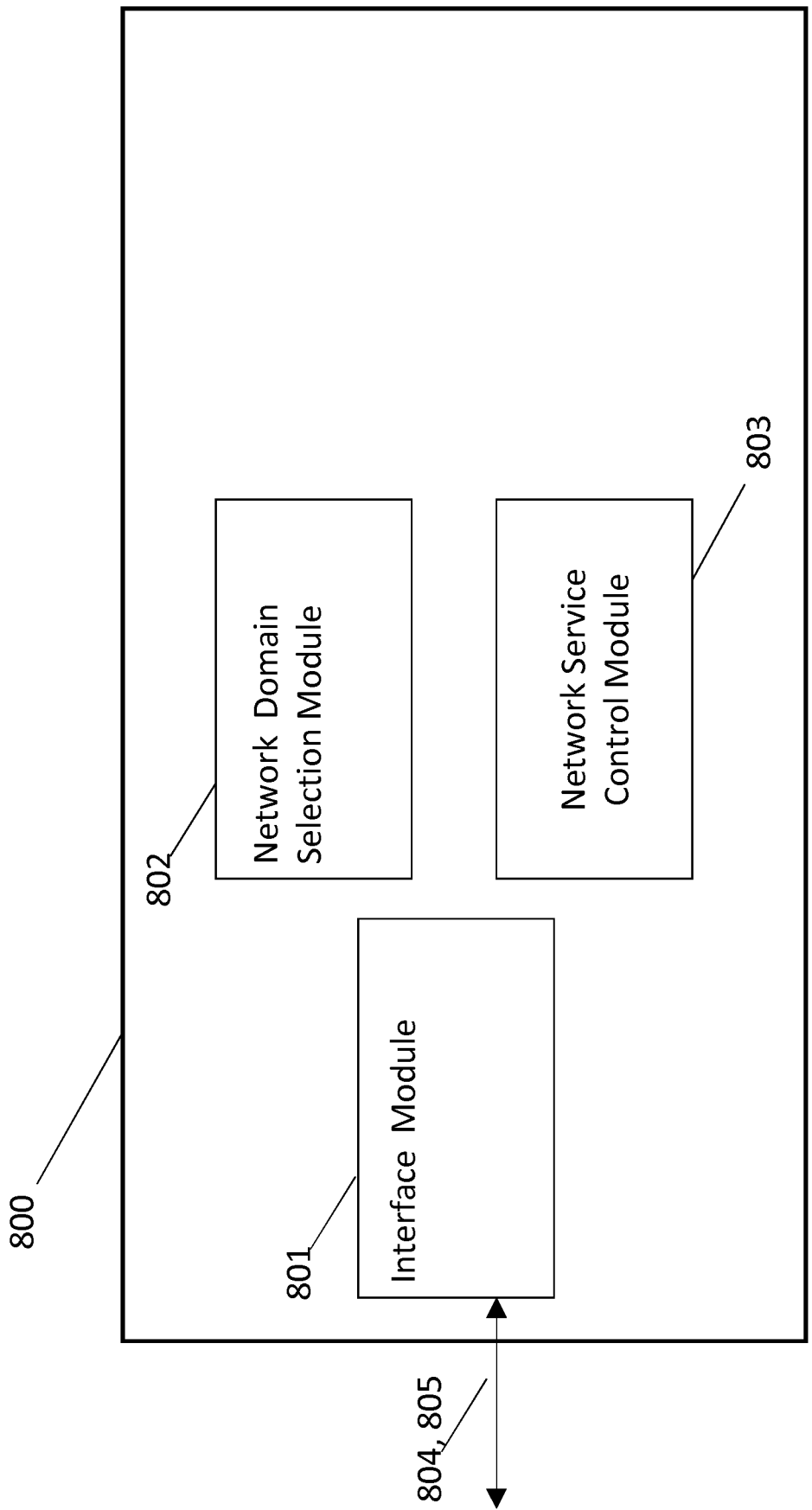
FIG. 9 shows an example of an apparatus according to a further embodiment of the disclosure.

FIG. 9 shows an apparatus 800 for controlling a multi domain service hierarchical communications network, for example an MDSC 120 or part thereof. The apparatus 800 comprises an Interface Module 801 for communicating with other network nodes. In some arrangements the Interface Module 801 is configured for communicating with one or more physical network control nodes, e.g. a PNC. In some arrangements the Interface Module 801 is also configured for communicating with a customer network control node, for example a CNC 110. The Interface Module 801 is configured to transmit and/or receive an indication of a minimum traffic capacity. The interface Module 801 may support a protocol compliant with one or more of a MPI 804 and a CMI 805. The apparatus 800 further comprises a Network Domain Selection Module 802 configured to select a physical network domain to provide a physical layer connection and a Network Service Control Module 803 configured to request a physical layer connection via the Interface Module 801 according to an indication of a minimum traffic capacity. In some arrangements the Network Domain Selection Module is further configured to receive 410 an indication for a minimum traffic capacity for a network connection. In some arrangements the Network Service Control Module 803 is further configured to translate 420 the received indication for a minimum traffic capacity for a network connection to a minimum traffic capacity indication for a physical layer connection.

In some arrangements the Interface Module 801 is further configured to receive a report indicating an available traffic capacity for the physical layer connection. In further arrangements the Network Service Control Module 803 is further configured to report the available traffic capacity to a customer network control node. In other arrangements the Network Service Control Module 803 is further configured to inform one or more other physical network domains of the available traffic capacity for the physical layer connection.

Figure 10:
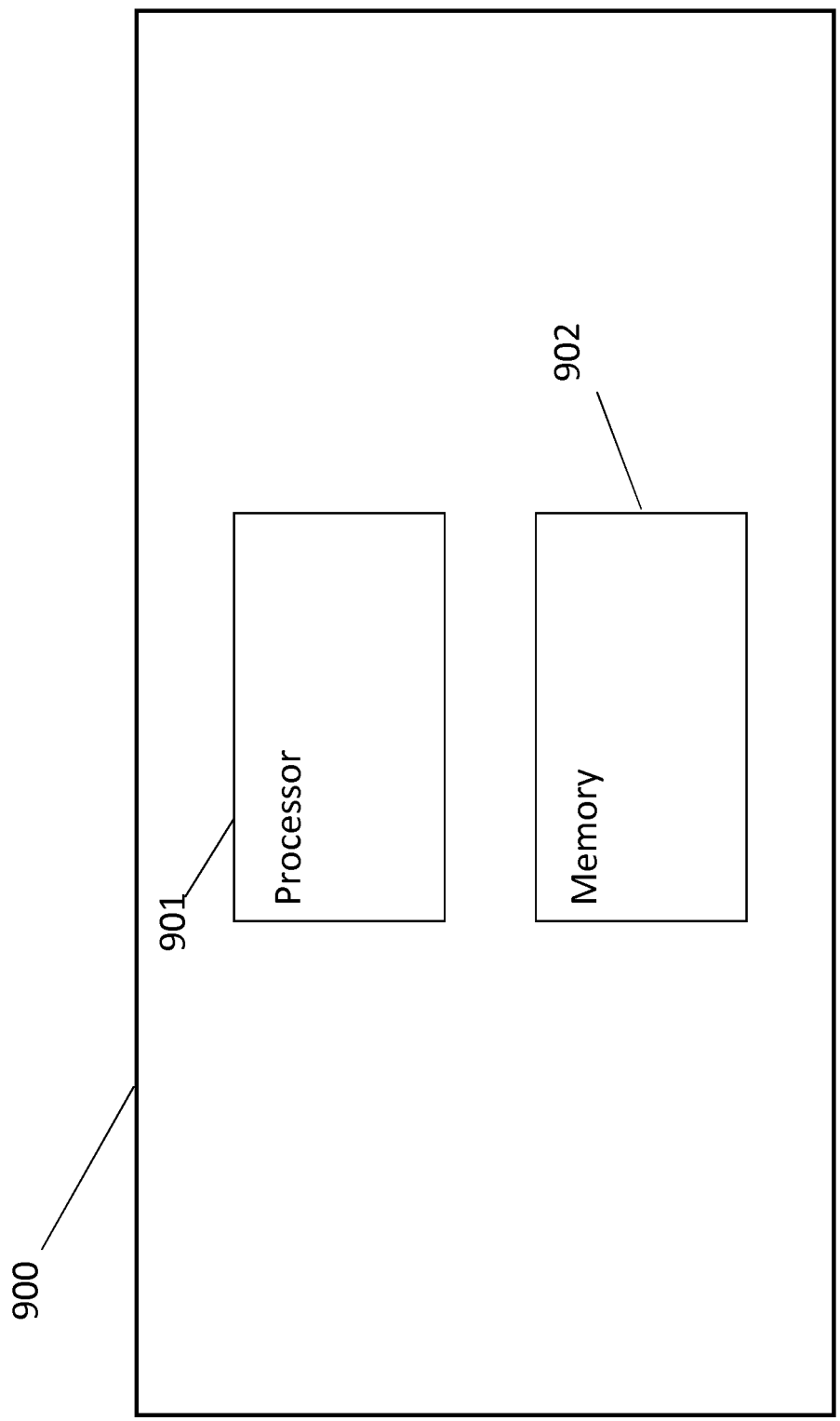
FIG. 10 shows a further example of an apparatus according to a further embodiment of the disclosure.

Referring to FIG. 10, the figure shows an example network controller 900, for example a MDSC 120, or part thereof. The network controller 900 comprises a processor 901 and a memory 902. The memory contains instructions executable by the processor. The network controller 900 is operative to implement the method described in any example.

In some aspects, the memory 902 contains instructions executable by the processor, whereby the physical network controller is operative to implement any example of the disclosure.

In an embodiment, the Interface Module 801, Network Domain Selection Module 802, and the Network Service Control Module 803 described above, or any example described, are implemented as a computer program running on the processor 901.

Figure 11:
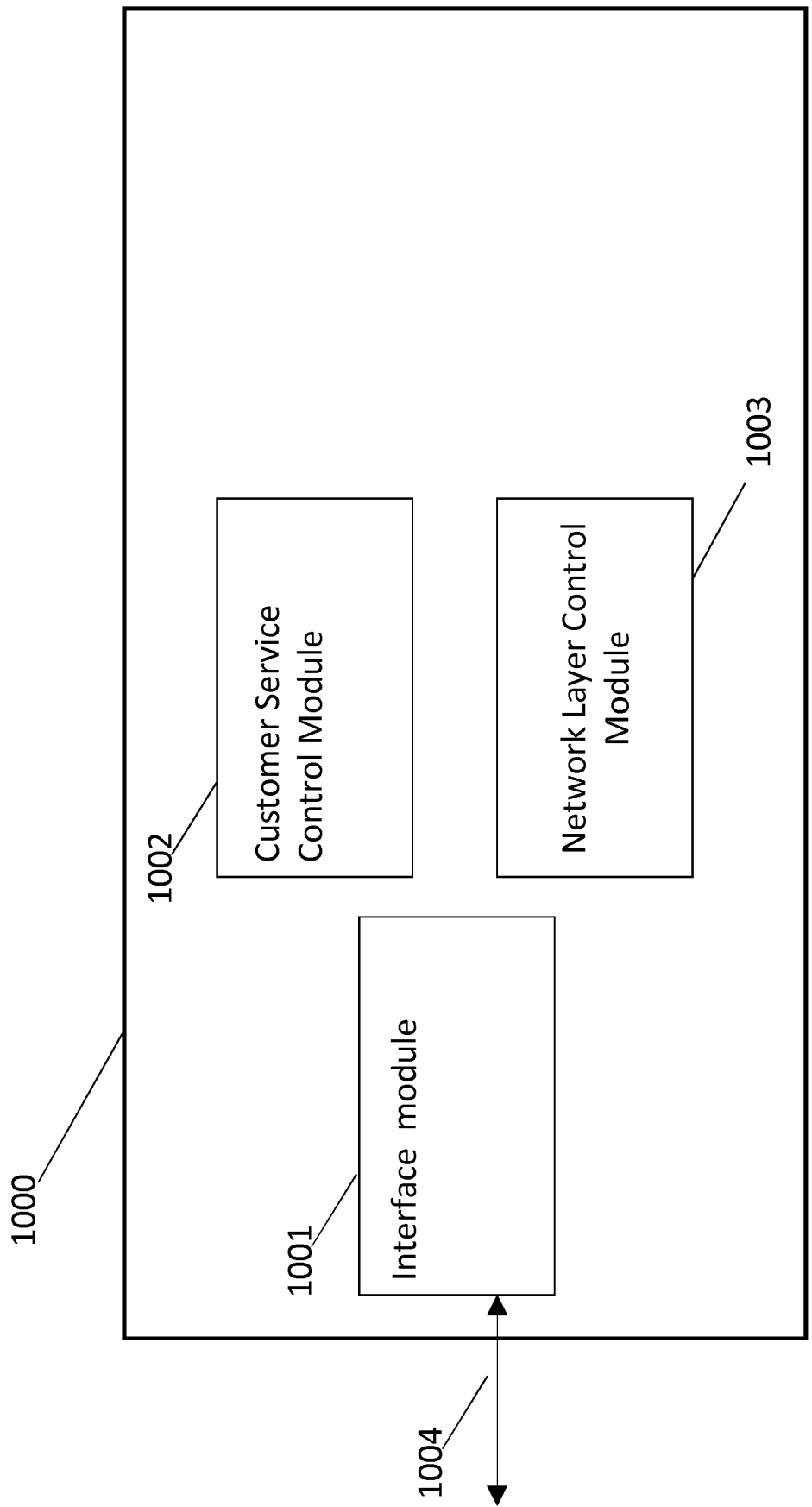
FIG. 11 shows an example of an apparatus according to a further embodiment of the disclosure.

In FIG. 11 an example apparatus 1000 for establishing a network connection in a hierarchical communications network is shown, for example a CNC 110 or part thereof. The apparatus 1000 comprises an Interface Module 1001 for communicating with other network nodes. In some arrangements the Interface Module 1001 is configured for communicating with one or more network controllers e.g. a MDSC. The Interface Module 1001 is configured to transmit an indication of a minimum traffic capacity. The interface Module 1001 may support a protocol compliant with a CMI 1004. The apparatus 1000 further comprises a Customer Service Control Module 1002 for determining customer service requirements. The apparatus 1000 is further comprised of a Network Layer Control Module 1003 configured to receive customer service requirements and to determine a network connection to be established with a required bandwidth to the meet the customer service requirements. The Network Layer Control Module is further configured to indicate a minimum traffic capacity for a requested network connection. The indication is transmitted via the Interface Module 1001 to a network controller. In some arrangements the Interface Module is further configured to receive an indication of available traffic capacity for a network connection, from a network controller. In some arrangements the Interface Module is configured to pass this indication to the Customer Service Control Module 1002 which is configured to adapt a service offering based on an indication of available traffic capacity.

The modules described may be implemented in software, firmware or hardware. A description of a separate module does not indicate a separate implementation, one or more modules may be implemented by the same software, firmware or hardware.

Figure 12:
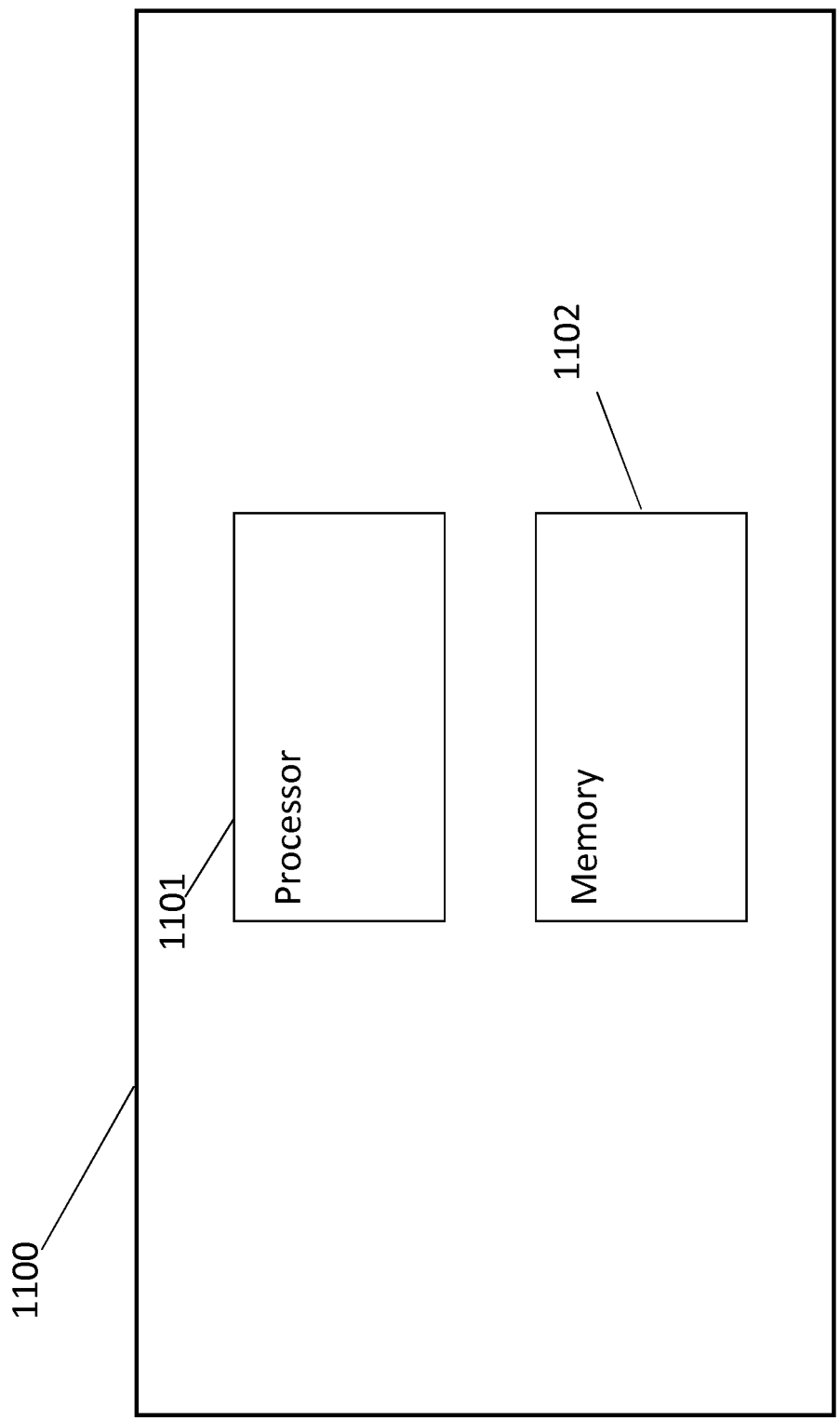
FIG. 12 shows a further example of an apparatus according to a further embodiment of the disclosure.

Referring to FIG. 12, the figure shows an example customer network control node 1100, for example a CNC 110, or part thereof. The customer network control node 1100 comprises a processor 1101 and a memory 1102. The memory contains instructions executable by the processor. The customer network control node 1100 is operative to implement the method described in any example.

In some aspects, the memory 1102 contains instructions executable by the processor, whereby the physical network controller is operative to implement any example of the disclosure.

In an embodiment, the Interface Module 1001, Customer Service Control Module 1002, and the Network Layer Control Module 1003 described above, or any example described, are implemented as a computer program running on the processor 1101.

Each control entity (e.g. the PNC, MDSC and CNC) may be implemented using one or more processors, hardware, processing hardware or circuitry. References to processors, hardware, processing hardware or circuitry can encompass any kind of logic or analogue circuitry, integrated to any degree, and may be general purpose processors, digital signal processors, ASICs, FPGAs, discrete components or logic and so on. References to a processor are intended to encompass implementations using multiple processors which may be integrated together, or co-located in the same node or distributed at different locations for example, or may be referred to as processing circuitry. The memory of any example may comprise any non-transitory machine-readable media known in the art or that may be developed, including but not limited to magnetic media (e.g., floppy disc, hard disc drive, etc.), optical media (e.g., CD-ROM, DVD-ROM, etc.), solid state media (e.g., SRAM, DRAM, DDRAM, ROM, PROM, EPROM, Flash memory, solid state disc, etc.), or the like. Alternatively, the memory used may be a transitory memory, e.g. RAM.

A further embodiment of the disclosure provides a computer program, comprising instructions which, when executed on at least one processor, cause the at least one processor to carry out any of the steps of the above described methods for establishing a network connection, controlling a network connection and configuring physical resources for a physical layer connection.

A further embodiment of the disclosure provides a carrier containing a computer program, comprising instructions which, when executed on at least one processor, cause the at least one processor to carry out any of the steps of any of the above methods of establishing a network connection, controlling a network connection and configuring physical resources for a physical layer connection. The carrier is one of an electronic signal, optical signal, radio signal, or computer readable storage medium.

In an example of the disclosure, the CNC 110 requests a 200G service between two domains (e.g. A and C), where premium traffic is 40% and best-effort is 60%. The premium traffic is desired to be continued even in the event of a failure, e.g. a DWDM link cut. The MDSC receives the request, and transmits a request to the PNC 130 for domain B, PNC B, for a 200G LSP along with an indication of 40% premium traffic and 60% best-effort. The PNC 130 controls physical resources of an EON, The PNC 130 responds to the MDSC with a 200G wavelength service. The MDSC 120 informs the PNC of other domains 140 of the optical tunnel in the EON domain. The EON domain is hit by a link cut and the end-points of the affected LSP reroute it over a much longer path using a 100G wavelength service (same line card). The PNC B 130 of the affected EON domain informs the MDSC that there is a 100G wavelength service with 80% premium and 20% best effort. The MDSC informs the PNC A and PNC C of the other domains that the tunnel is now 1000, with still 20% capacity for best effort traffic. The controller hierarchy in the described ACTN framework to allow the exploitation of Elastic Physical Networking by characterizing LSPs with "premium" and "best effort" bandwidths. The PNC of a domain is configured to control the domain to use the elastic capability of the physical resources, e.g. by varying the modulation or bit rate on a link, in order to provide the indicated guaranteed traffic capacity. The physical resources can be elastically controlled to not meet the total requested traffic, if this is not possible. Thus, the network is better able to be elastically configured to provide the guaranteed traffic capacity.

| Abbreviation | Explanation |
|---|---|
| ACTN | Abstraction and Control of Traffic Engineered Networks |
| CMI | CNC-MDSC Interface |
| CNC | Customer Network Controller |
| DWDM | Dense Wavelength Division Multiplexing |
| EON | Elastic Optical Network |
| EPN | Elastic Physical Network |
| LSP | Label-Switched Path |
| MPI | MDSC-PNC Interface |
| MDSC | Multi Domain Service Coordinator |
| PCE | Path Computation Element |
| PNC | Physical Network Controller |
| QoS | Quality of Service |
| SDN | Software Defined Networking |
| SLA | Service Level Agreement |
| VN | Virtual Network |
| WDM | Wavelength Division Multiplexing |

The invention claimed is:

1. A method, performed by a higher-layer network controller configured in a hierarchical arrangement with a customer network control node and one or more physical network controllers in a communications network, for establishing a plurality of physical layer connections, the method comprising:
receiving, from the customer network control node, an indication for a minimum traffic capacity for a network connection having a maximum desired traffic capacity; and
transmitting, to a physical network controller, a request for a physical layer connection corresponding to the network connection and having the maximum desired traffic capacity, wherein the request includes an indication for a minimum traffic capacity for the physical layer connection.

2. The method of claim 1, further comprising:
receiving an indication of an available traffic capacity for the physical layer connection.

3. The method of claim 2, wherein the indication of the available traffic capacity is received from a first physical network controller and the request is transmitted to a second physical network controller.

4. The method of claim 2, further comprising reporting the indication of an available traffic capacity to the customer network control node.

5. The method of claim 1, further comprising translating the received indication for a minimum traffic capacity for a network connection into the indication of a minimum traffic capacity for the physical layer connection.

6. A higher-layer network controller configured in a hierarchical arrangement with a customer network control node and one or more physical network controllers in a communications network, the higher-layer network controller comprising:
a processor; and
a memory storing instructions executable by the processor, whereby the network controller is configured to perform operations corresponding to the method of claim 1.

7. A non-transitory, computer-readable medium storing computer-executable instructions that, when executed by processing circuitry of a higher-layer network controller configured in a hierarchical arrangement with a plurality of physical network controllers and a customer network control node in a communications network, configure the higher-layer network controller to perform operations corresponding to the method of claim 1.

8. A method performed in a customer network control node configured in a hierarchical arrangement with one or more higher-layer network controllers and one or more physical network controllers in a communications network, the method comprising:

determining a need for a network connection having a maximum desired traffic capacity to be established for a differentially priced service offering with a required bandwidth associated with a first tariff, wherein the required bandwidth comprises a minimum traffic capacity; and transmitting, to a higher-layer network controller, an indication of the minimum traffic capacity for the network connection having the maximum desired traffic capacity.

9. The method of claim 8, further comprising:

receiving an indication of an available traffic capacity for the network connection;

adapting the differentially priced service offering from the first tariff to a second tariff based on the received indication of an available traffic capacity for the network connection.

10. A customer network control node configured in a hierarchical arrangement with one or more higher-layer network controllers and one or more physical network controllers in a communications network, wherein the customer network control node comprises:

a processor; and a memory storing instructions executable by the processor, whereby the network controller is configured to perform operations corresponding to the method of claim 8.

11. The customer network control node of claim 10, wherein execution of the instructions further configures the customer network control node to:

receive an indication of an available traffic capacity for the network connection; and adapt the differentially priced service offering from the first tariff to a second tariff based on the received indication of an available traffic capacity for the network connection.

12. A non-transitory, computer-readable medium storing computer-executable instructions that, when executed by processing circuitry of a customer network control node configured in a hierarchical arrangement with a plurality of physical network controllers and one or more higher-layer network controllers in a communications network, configure the customer network control node to perform operations corresponding to the method of claim 8.

* * * * *

UNITED STATES PATENT AND TRADEMARK OFFICE
CERTIFICATE OF CORRECTION

PATENT NO. : 11,784,740 B2
APPLICATION NO. : 16/334222
DATED : October 10, 2023
INVENTOR(S) : Bruno et al.

It is certified that error appears in the above-identified patent and that said Letters Patent is hereby corrected as shown below:

In the Specification

In Column 2, Line 9, delete "if" and insert -- of --, therefor.

In Column 2, Line 30, delete "Type" and insert -- Technology --, therefor.

In Column 16, Lines 4-10, delete "The request may include criteria for the failure of the connection, for example that the minimum traffic capacity must survive a single link failure (e.g. severed physical link). The request may include criteria for the failure of the connection, for example that the minimum traffic capacity must survive a single link failure (e.g. severed physical link)." and insert -- The request may include criteria for the failure of the connection, for example that the minimum traffic capacity must survive a single link failure (e.g. severed physical link). --, therefor.

In Column 19, Line 43, delete "1000," and insert -- 100G, --, therefor.

Signed and Sealed this
Twenty-ninth Day of October, 2024

*Katherine Kelly Vidal*

Katherine Kelly Vidal
*Director of the United States Patent and Trademark Office*